US012695771B2

(12) United States Patent
Yagnik et al.

(10) Patent No.: US 12,695,771 B2
(45) Date of Patent: Jul. 28, 2026

(54) REMOTE MANAGEMENT OF HOSTED SERVICES

(71) Applicant: Sophos Limited, Abingdon (GB)

(72) Inventors: Vivek Rudraduttbhai Yagnik, Coquitlam (CA); John Mears, Oxfordshire (GB); Narendrakumar Jagadishkumar Shah, Gujarat (IN)

(73) Assignee: Sophos Limited, Abingdon (GB)

( * ) Notice: Subject to any disclaimer, the term of this patent is extended or adjusted under 35 U.S.C. 154(b) by 170 days.

(21) Appl. No.: 18/517,202

(22) Filed: Nov. 22, 2023

(65) Prior Publication Data

US 2024/0291789 A1      Aug. 29, 2024

(30) Foreign Application Priority Data

Feb. 27, 2023      (IN) .............................. 202311013127
May 16, 2023      (IN) .............................. 202311034331

(51) Int. Cl.
*H04L 9/40* (2022.01)
*G06Q 10/107* (2023.01)
*H04L 51/214* (2022.01)

(52) U.S. Cl.
CPC ....... *H04L 63/1425* (2013.01); *G06Q 10/107* (2013.01); *H04L 51/214* (2022.05); *H04L 63/0807* (2013.01); *H04L 63/0823* (2013.01); *H04L 63/20* (2013.01)

(58) Field of Classification Search
CPC ............... H04L 63/1425; H04L 51/214; H04L 63/0807; H04L 63/0823; H04L 63/20; G06Q 10/107
See application file for complete search history.

(56) References Cited

U.S. PATENT DOCUMENTS

| | | | | |
|---|---|---|---|---|
| 8,752,172 | B1 * | 6/2014 | Dotan ................. | H04L 63/1483 |
| | | | | 709/206 |
| 9,930,051 | B1 * | 3/2018 | Potlapally ............. | H04L 63/126 |
| 11,066,164 | B1 | 7/2021 | Tsong | |
| 11,095,706 | B1 * | 8/2021 | Ankam ................. | H04L 63/126 |
| 11,496,519 | B1 * | 11/2022 | Gupta ................... | H04L 9/0891 |

(Continued)

OTHER PUBLICATIONS

"U.S. Appl. No. 18/517,321 Non-Final Office Action mailed Jun. 2, 2025", 21 pages.

(Continued)

*Primary Examiner* — Madhu Woolcock
(74) *Attorney, Agent, or Firm* — Strategic Patents, P.C.

(57) ABSTRACT

Remote services, such as security services, are onboarded for a tenant in a multi-tenant environment, such as a cloud-based electronic mail tenant, by configuring the tenant to permit remote access to local resources used at the tenant to facilitate the remote security services. As a significant advantage, this permits use of the remote security services with cloud-based enterprise resources hosted on the tenant, e.g., an enterprise mail server handling inbound and/or outbound electronic mail traffic, without requiring changes to the tenant's network configuration. As an additional advantage, security risks associated with the remote access may be confined to the specific tenant in the multi-tenant environment by creating a unique key for exchanging data between the tenant and the remote security services.

20 Claims, 8 Drawing Sheets

(56) References Cited

U.S. PATENT DOCUMENTS

| | | | | |
|---|---|---|---|---|
| 11,546,358 | B1* | 1/2023 | Robinson | ............... H04L 63/205 |
| 2006/0075052 | A1* | 4/2006 | Oostendorp | .......... H04L 51/212 |
| | | | | 709/206 |
| 2006/0224742 | A1* | 10/2006 | Shahbazi | ................ H04L 63/20 |
| | | | | 709/226 |
| 2007/0005716 | A1* | 1/2007 | LeVasseur | ........... H04L 9/3263 |
| | | | | 709/206 |
| 2007/0094260 | A1* | 4/2007 | Murphy | .................. G06F 21/51 |
| | | | | 707/999.009 |
| 2007/0113101 | A1* | 5/2007 | LeVasseur | ........... H04L 63/126 |
| | | | | 713/176 |
| 2011/0247066 | A1* | 10/2011 | Lee | ......................... H04L 63/10 |
| | | | | 726/19 |
| 2013/0198871 | A1 | 8/2013 | Shanabrook et al. | |
| 2015/0100788 | A1* | 4/2015 | Chastain | ............. H04L 63/0853 |
| | | | | 713/168 |
| 2015/0172321 | A1* | 6/2015 | Kirti | ................... H04L 63/1416 |
| | | | | 726/1 |
| 2016/0269364 | A1* | 9/2016 | White | ..................... H04L 63/20 |
| 2017/0078248 | A1* | 3/2017 | Bian | ....................... H04L 63/20 |
| 2018/0054414 | A1* | 2/2018 | LeVasseur | ........... H04L 63/145 |
| 2018/0262484 | A1* | 9/2018 | Kesari | .................... H04L 51/42 |
| 2019/0098037 | A1 | 3/2019 | Shenoy, Jr. et al. | |
| 2019/0349357 | A1* | 11/2019 | Shukla | .................... H04L 63/20 |
| 2019/0364007 | A1 | 11/2019 | Osborne, III | |
| 2020/0396190 | A1* | 12/2020 | Pickman | ............... H04L 67/306 |
| 2021/0092116 | A1* | 3/2021 | Zimmermann | ..... H04L 63/0823 |
| 2021/0250317 | A1* | 8/2021 | Kras | ....................... H04L 69/22 |
| 2021/0266294 | A1* | 8/2021 | Chechik | ................ H04L 63/105 |
| 2022/0394047 | A1* | 12/2022 | Lee | ....................... H04L 63/145 |
| 2023/0039382 | A1* | 2/2023 | Xu | ......................... G06F 21/554 |
| 2023/0096084 | A1* | 3/2023 | Popelka | ................ G06F 9/4881 |
| | | | | 726/4 |
| 2023/0198969 | A1 | 6/2023 | Joshi et al. | |
| 2024/0195888 | A1* | 6/2024 | Lopez | ................... G06F 3/0483 |
| 2024/0223534 | A1* | 7/2024 | Gu | ....................... H04L 63/0245 |
| 2024/0291839 | A1 | 8/2024 | Yagnik et al. | |
| 2024/0419787 | A1 | 12/2024 | Desai et al. | |

OTHER PUBLICATIONS

"U.S. Appl. No. 18/517,321 Final Office Action mailed Nov. 24, 2025", 22 pages.
"U.S. Appl. No. 18/517,321 Non-Final Office Action mailed Feb. 12, 2026", 26 pages.

* cited by examiner

REMOTE MANAGEMENT OF HOSTED SERVICES

CROSS-REFERENCE TO RELATED APPLICATIONS

This application claims priority to Indian Patent App. No. 202311034331 filed on May 16, 2023, and Indian Patent App. No. 202311013127 filed on Feb. 27, 2023, where the entire content of each of the foregoing applications is hereby incorporated by reference herein.

This application is also related to U.S. patent application Ser. No. 18/517,321 entitled "DETECTING TAMPERING WITH HOSTED SERVICES" filed on Nov. 22, 2023, the entire content of which is hereby incorporated by reference herein.

BACKGROUND

A variety of platforms are known providing web-based, or more generally, network-based services such as electronic mail, web applications, zero-trust network applications, websites, web services, cloud computing, and so forth. While these hosted services may provide a resilient, scalable platform for deploying resources to customers, they may present a challenge when integrating third party services. For example, when secure access is provided to a third party, this may present a very large attack surface that may place some or all of the users of the hosted service at risk. As another challenge, a third party with elevated privileges may reconfigure, or attempt to reconfigure the hosted service in ways that impair performance, create network conflicts, and so forth.

There remains a need for improved remote management of hosted services, particularly for third party services who require elevated privileges to provide augmented management, security and the like.

SUMMARY

Remote services, such as security services, are onboarded for a tenant in a multi-tenant environment, such as a cloud-based electronic mail tenant, by configuring the tenant to permit remote access to local resources used at the tenant to facilitate the remote security services. As a significant advantage, this permits use of the remote security services with cloud-based enterprise resources hosted on the tenant, e.g., an enterprise mail server handling inbound and/or outbound electronic mail traffic, without requiring changes to the tenant's network configuration. As an additional advantage, security risks associated with the remote access may be confined to the specific tenant in the multi-tenant environment by creating a unique key for exchanging data between the tenant and the remote security services.

In one aspect, a method for securely processing electronic mail disclosed herein includes receiving a request from a user, at a console of a threat management facility, to securely manage electronic mail communications for an electronic mail tenant hosted at a first cloud computing platform, where the electronic mail tenant hosts an electronic mail service for an enterprise associated with the user; and, in response to the request, initiating secure management of the electronic mail tenant from a security tenant hosted at the first cloud computing platform by, from the security tenant, performing the steps of: causing the electronic mail tenant to create a digital identity for the security tenant to use one or more services of the electronic mail tenant, obtaining a set of permissions from the electronic mail tenant for the digital identity to modify mail flow rules used by the electronic mail tenant to process electronic mail traffic, securing communications between the electronic mail tenant and the security tenant with a secret stored by the security tenant and uniquely associated with the digital identity of the electronic mail tenant, and causing the digital identity to modify the mail flow rules for the electronic mail tenant to redirect electronic mail traffic to a mail security service hosted on the security tenant.

The digital identity may modify the mail flow rules to redirect outbound electronic mail traffic from the electronic mail tenant to a remote mail security service for security analysis. The method may further include assessing a security risk of an outbound electronic mail message with the remote mail security service. The method may further include, in response to identifying an elevated security risk associated with the outbound electronic mail message, initiating a remedial action. The method may further include, in response to determining that the outbound electronic mail message does not pose an elevated security risk, returning the outbound electronic mail message to the electronic mail tenant for outbound handling as a safe message.

The digital identity may modify the mail flow rules to redirect inbound electronic mail traffic for the electronic mail tenant to a remote mail security service. The method may further include assessing a security risk of an inbound electronic mail message with the remote mail security service. The method may further include, in response to identifying an elevated security risk associated with the inbound electronic mail message, initiating a remedial action. The method may further include, in response to determining that the inbound electronic mail message does not pose an elevated security risk, returning the inbound electronic mail message to the electronic mail tenant for inbound handling as a safe message.

Securing communications may include using a cryptographic key associated with the digital identity to create a digitally signed certificate used by the security tenant to obtain an access token for programmatic access to the electronic mail tenant. The security tenant may be a second electronic mail tenant hosted on the first cloud computing platform. The threat management facility may be hosted on a second cloud computing platform remote from the first cloud computing platform and coupled to the second cloud computing platform through a data network. The set of permissions may include a permission for at least one of managing the electronic mail tenant, reading directory data at the electronic mail tenant, reading activity for the electronic mail tenant, signing into the electronic mail tenant, and reading domain information for the electronic mail tenant. The securing the set of permissions may include securing a permission for read and write access to role-based access control settings for the electronic mail tenant. The method may include verifying a domain used by the electronic mail tenant before creating the digital identity.

In another aspect, a method for remotely managing a service tenant in a cloud computing platform disclosed herein includes providing a management service executing on a management tenant in the cloud computing platform; receiving a request from a user, at a console of a management facility remote from the cloud computing platform, to manage the service tenant; and, in response to the request, initiating remote management of the service by, from the management tenant, performing the steps of: causing the service tenant to create a digital identity for the management tenant to use one or more services of the service tenant, securing a set of permissions from the service tenant for the digital identity to modify operation of the service tenant, configuring the digital identity to authenticated to the service tenant based on a cryptographic key, the cryptographic key uniquely associated with the service tenant and the digital identity, and causing the digital identity to modify operation of the service tenant for remote use of the security service of the security tenant.

In another aspect, a system disclosed herein includes a first cloud computing platform hosting a service tenant and a management tenant, and a threat management facility providing security services for the service tenant. The threat management facility may be configured to, in response to a request from a user at a console of the threat management facility, perform the steps of: causing the service tenant to create a digital identity for the management tenant to use one or more services of the service tenant, securing a set of permissions from the service tenant for the digital identity to modify operation of the service tenant, configuring the digital identity to authenticated to the service tenant based on a cryptographic key, the cryptographic key uniquely associated with the service tenant and the digital identity, and causing the digital identity to modify operation of the service tenant for remote use of a security service of the service tenant.

The service tenant may be a first electronic mail tenant hosted on the first cloud computing platform, and the management tenant may be a second electronic mail tenant hosted on the first cloud computing platform. The threat management facility may be hosted on a second cloud computing platform remote from the first cloud computing platform and coupled to the second cloud computing platform through a data network. Securing the set of permissions may include securing a permission for read and write access to role-based access control settings for the service tenant.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
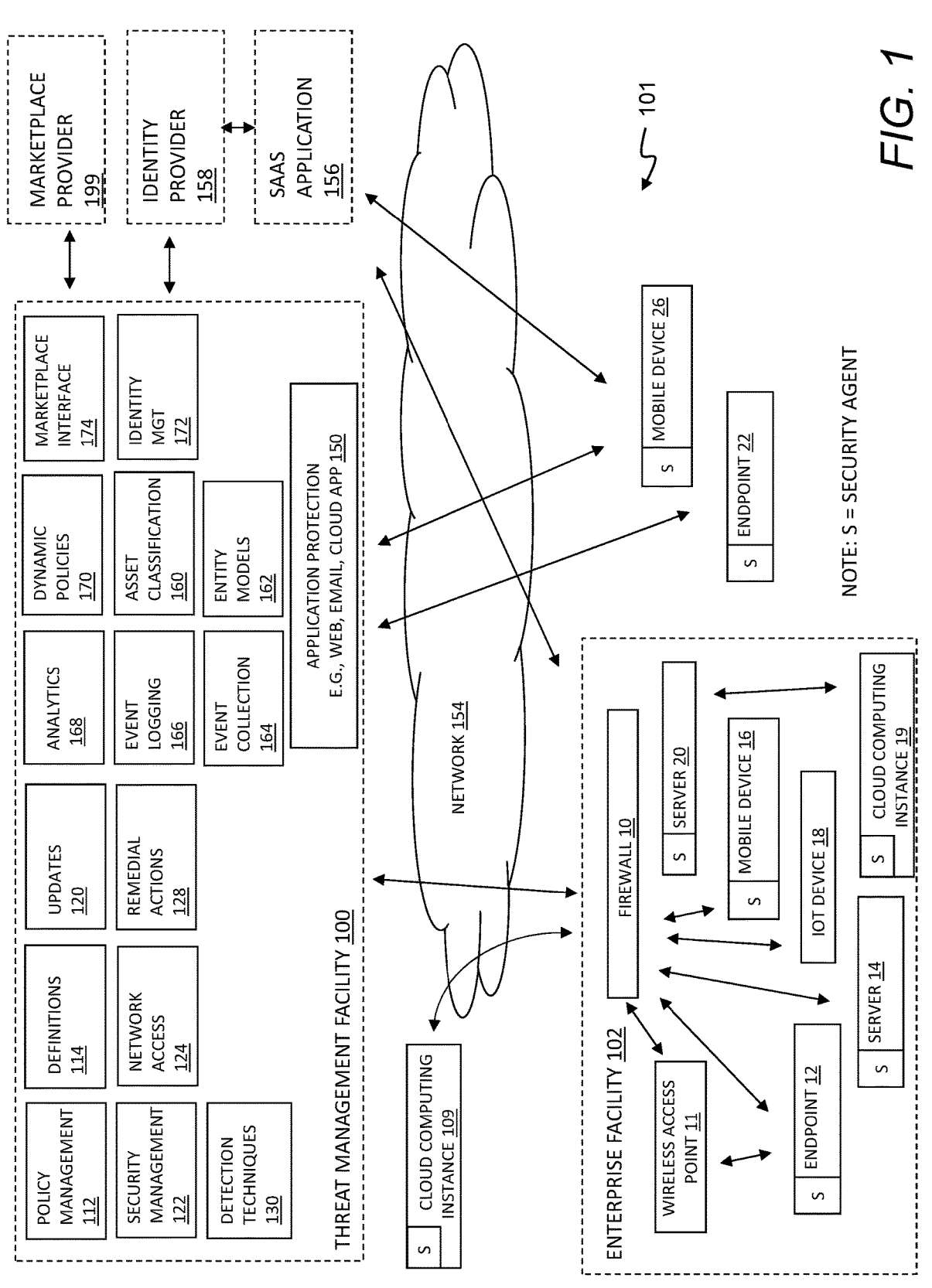
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "of" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IoT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as MICROSOFT® AZURE®, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 may inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, MICROSOFT OFFICE365® applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data may be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that may be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that is accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be the identification of an application that is communicating over a network.

The event logging facility 166 may be used to store events collected by the event collection facility 164. The event logging facility 166 may store collected events so that they may be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
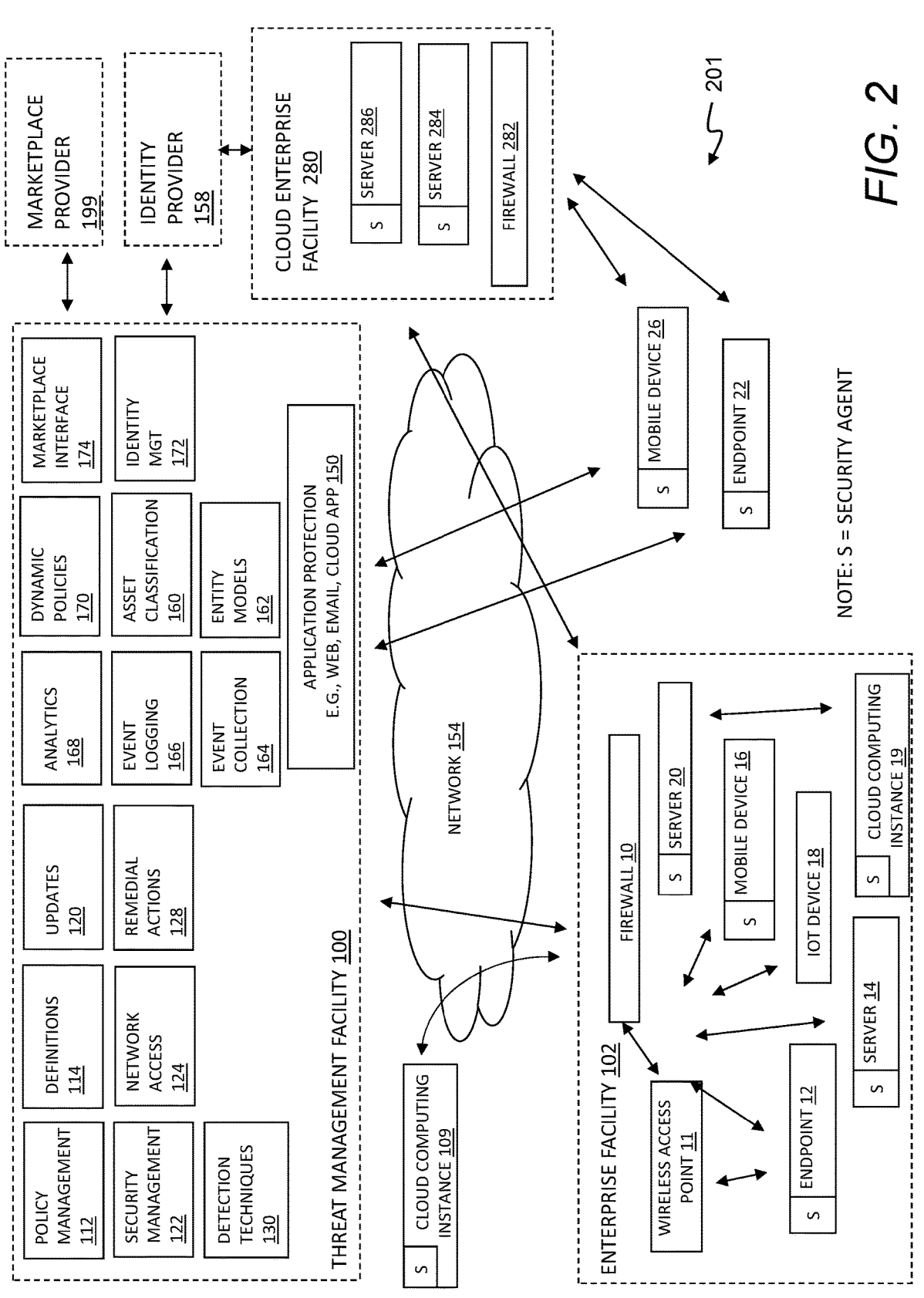
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
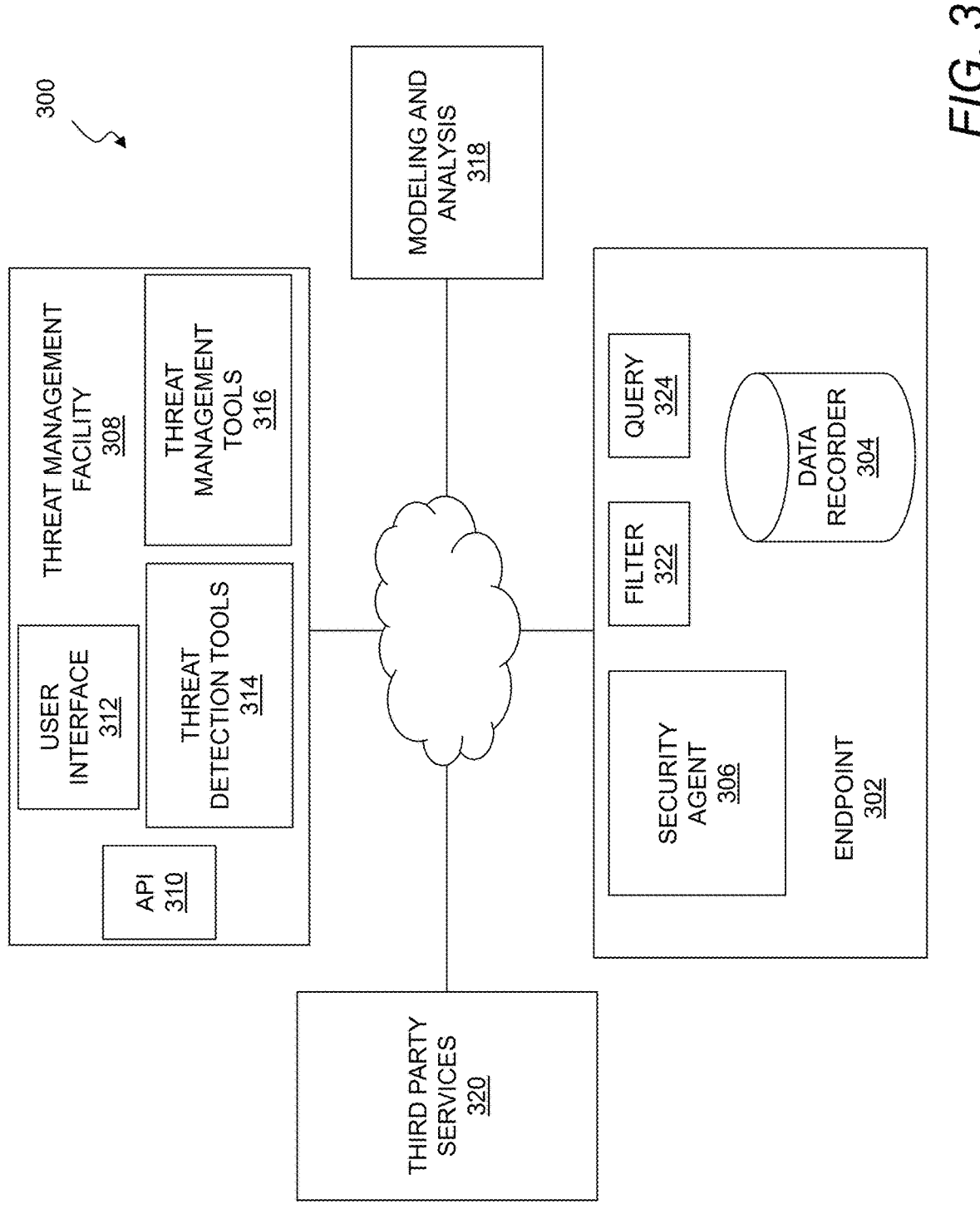
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 may locally or globally tune filtering by local agents based on the current data stream, and may query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources may be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 may increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 may query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
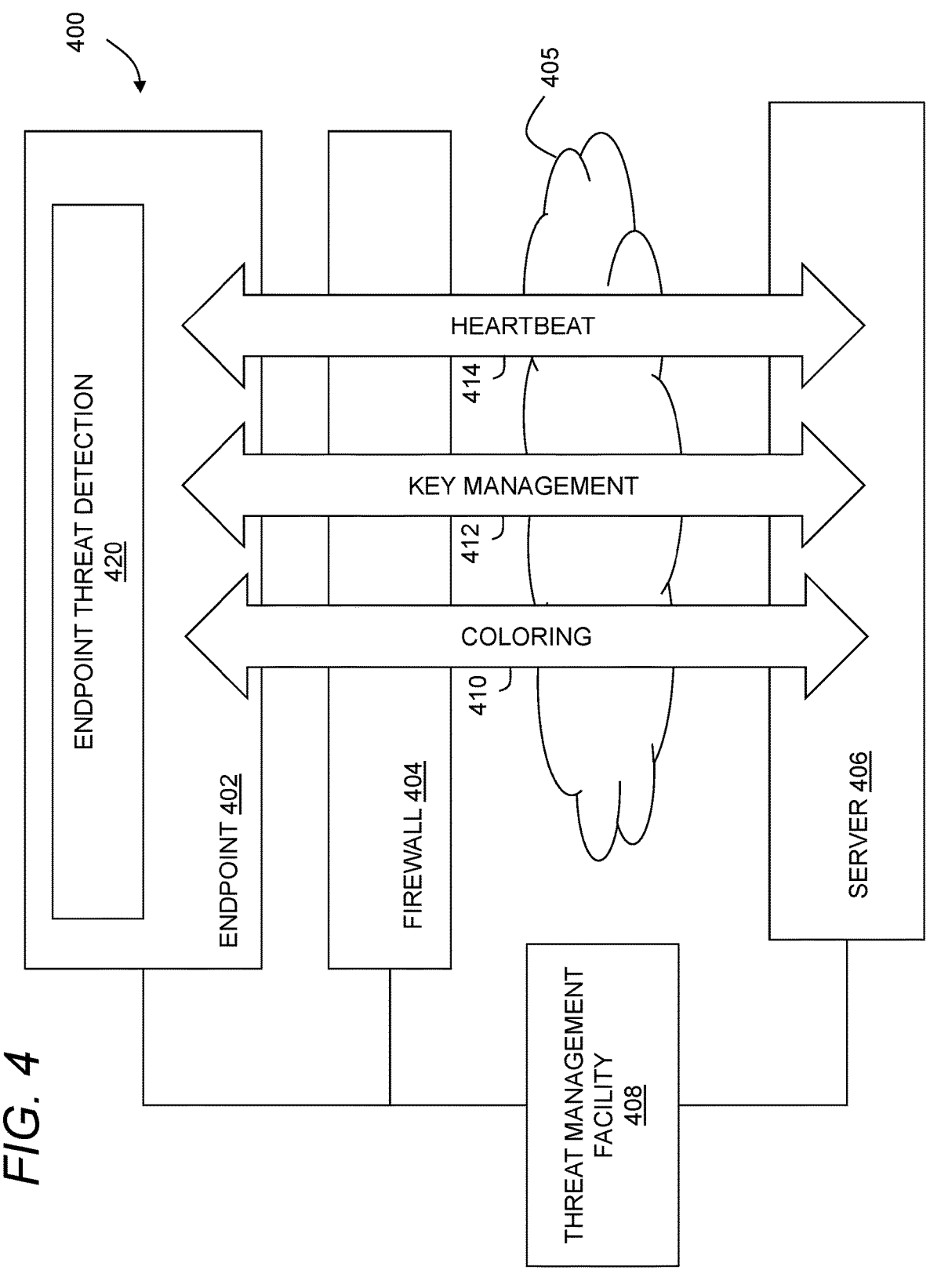
FIG. 4 illustrates a threat management system.

FIG. 4 illustrates a threat management system. In general, the system 400, which may be any of the enterprise networks and/or other networks or systems described herein, may include an endpoint 402, a firewall 404, a server 406 and a threat management facility 408 coupled to one another directly or indirectly through a data network 405, all as generally described above with reference to FIGS. 1-3. Each of the entities depicted in FIG. 4 may, for example, be implemented on one or more computing devices such as the computing devices described herein. A number of systems and subsystems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files may be opened, deleted, or otherwise modified. More generally, the cooperation of these systems enables a wide variety of reactive measures that may improve detection and remediation of potential threats to an endpoint.

Figure 5:
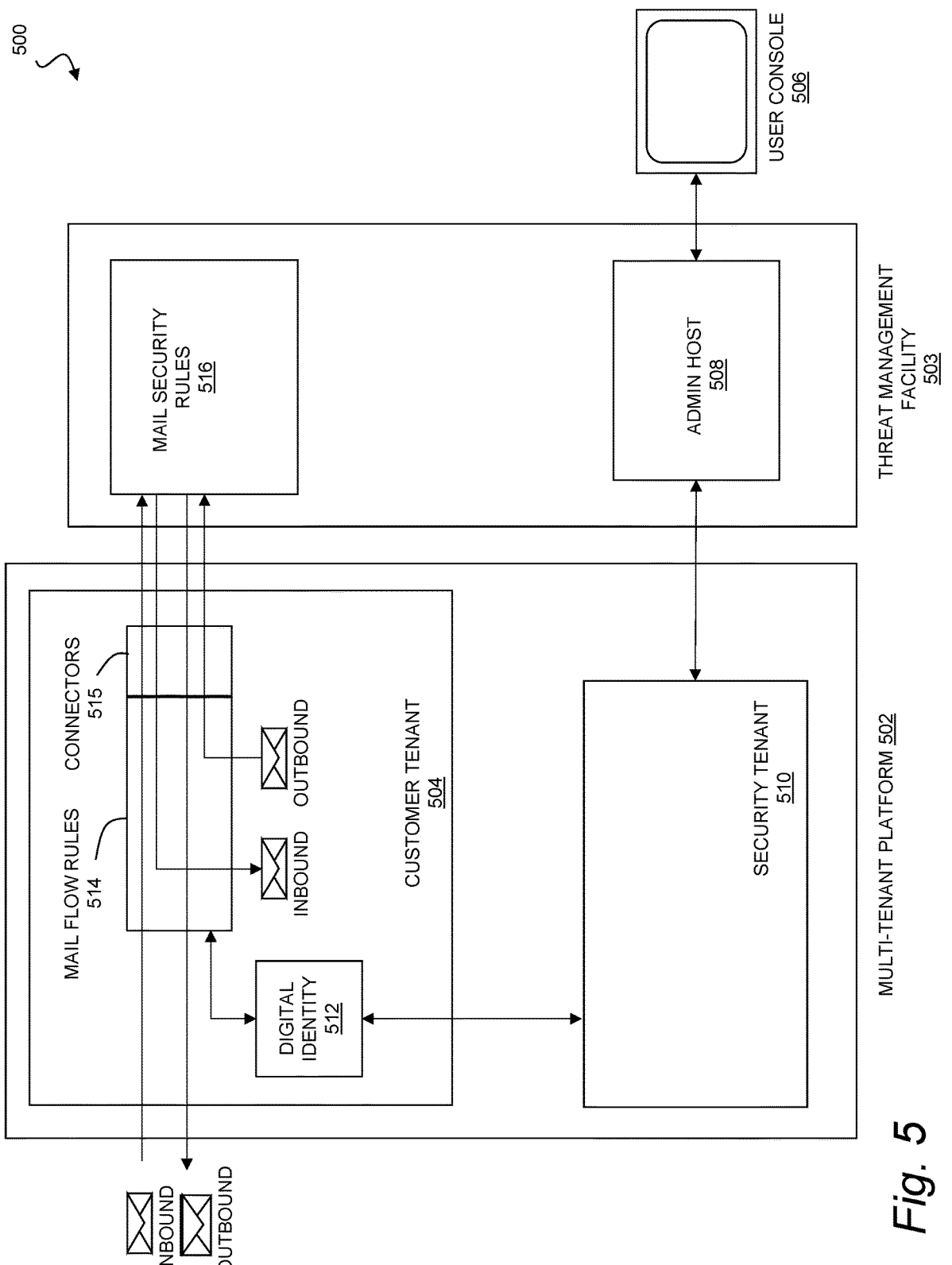
FIG. 5 shows a multi-tenant environment managed by a threat management facility.

FIG. 5 shows a multi-tenant environment managed by a threat management facility. In general, the environment 500 may include a multi-tenant platform 502 and a threat management facility 503. The multi-tenant platform 502 may, for example, include any software architecture (and corresponding hardware) that enables multiple customers, or tenants, to share a single instance of an application or service while keeping their data and configurations isolated from each other. This approach is commonly used in cloud-based applications, where the platform provider hosts the application and provides access to it to multiple customers or tenants. Each tenant may have its own database, user interface, and configuration settings, but they all share the same underlying software and infrastructure. Multi-tenancy offers several benefits, including data separation, cost savings, improved scalability, and increased flexibility. It allows multiple organizations to use the same software without having to invest in custom infrastructure, and it makes it easier to add or remove tenants as needed. It also helps to ensure data security and privacy, as each tenant's data is isolated from the others. A variety of multi-tenant platforms are commercially available, and may be used to host a customer tenant 504 as described herein. For example, in one aspect this may include an OFFICE365@ instance for an enterprise, or more specifically, an OFFICE365@ electronic mail tenant for an enterprise.

The multi-tenant platform 502 may include a customer tenant 504 using remote security services of the threat management facility 503. The customer tenant 504 may be any tenant providing customer services from the multi-tenant platform 502. For example, the customer tenant may be an electronic mail tenant providing electronic mail services (e.g., MICROSOFT OUTLOOK®) within an enterprise network, or more generally, any service tenant providing hosted services for a customer in a multi-tenant environment.

The threat management facility 503 may be any service or combination of services useful for providing security to an enterprise network, such as an enterprise network associated with the customer tenant 504. The threat management facility 503 may, for example, include any of the threat management facilities described herein (e.g., threat management facility 308 in FIG. 3) or in U.S. application Ser. No. 18/089,967 filed on Dec. 28, 2022, the entire contents of which are hereby incorporated by reference herein.

In general, the threat management facility 503 may provide a user console 506 for access by administrators and other users to functions, data, and the like of the threat management facility 503. For example, the user console 506 may be used by an administrator for the customer operating the customer tenant 504 in order to configure security services provided by the threat management facility 503 for use on the customer tenant 504. The user console 506, which may include any of the user interfaces or the like described herein, may be hosted by an administrative host 508 executing on the threat management facility 503, and responsible for providing user access to administrative functions of the threat management facility.

In one aspect, the administrative host 508 may use resources of the threat management facility 503 to access a security tenant 510 hosted on the multi-tenant platform 502. By operating a security tenant 510 on the same multi-tenant platform 502 that hosts the customer tenant 504, the threat management facility 503 may use native management resources, role-based access control infrastructure, identity management, authentication, authorization, key management, and other tools and the like in the environment of the customer tenant 504. This may also improve security by avoiding programmatic excursions outside the multi-tenant platform 502 while managing services to the customer tenant 504. However, it is to be appreciated that the security tenant 510 may alternatively be hosted on a tenant platform separate from the customer tenant 504 (e.g., a single-tenant platform). It should also be appreciated that, while FIG. 5 illustrates an example of an electronic mail tenant managed by a remote security service, any tenant or other remotely hosted resource, e.g. more generally a service tenant, may also or instead be used as the customer tenant 504 described herein. Similarly, while FIG. 5 depicts a delivery of security services, any service that might be remotely hosted and used by the customer tenant 504 may also or instead use a second tenant, e.g., a management tenant, to manage the delivery of third-party services to the customer tenant.

As further described herein, the security tenant 510 may cause the customer tenant 504 to create a digital identity 512 as a user on the customer tenant 504. In general, the digital identity 512 may be any collection of data that identifies the customer tenant 504 within the environment 500, such as a name, username, email address, phone number, digital certificates, IP address, and other uniquely identifying data. The digital identity 512 may obtain any permissions or the like from the customer tenant 504 necessary or helpful for delivery of security services by the threat management facility 503 (or more generally, remote services by a third party, remote service provider). Although not illustrated in FIG. 5, this may also include the creation or retrieval of key material to be uniquely associated with the digital identity 512 and the customer tenant 504, to be used for authentication and authorization of downstream interactions with the customer tenant 504. This advantageously restricts the attack surface for a key compromise to a particular customer tenant 504 that is being managed by the digital identity 512.

After obtaining suitable permissions, the digital identity 512 may configure services of the customer tenant 504 using any suitable application programming interfaces, local services, or the like. For example, in a MICROSOFT OFFICE365 environment (where an electronic mail tenant may be hosted), this may include configuring mail flow rules for the customer tenant 504 using the native MICROSOFT Graph API of the OFFICE365 environment. The MICROSOFT Graph API is a RESTful web API provided by MICROSOFT that allows developers to access a wide range of data and functionality across MICROSOFT cloud services, including OFFICE365, ONEDRIVE®, ASURE® Active Directory, and more. Using the MICROSOFT Graph API, developers may retrieve and manipulate data from multiple MICROSOFT services through a single endpoint. This includes user and group management, email and calendar integration, document management, and much more. The Graph API uses standard HTTP methods and OAuth 2.0 authentication, making it easy to integrate with a variety of programming languages and platforms. It provides a consistent way to access data across MICROSOFT services, reducing the need for developers to learn multiple APIs and authentication methods. The MICROSOFT Graph API may be used by developers to build custom applications and integrate MICROSOFT services into existing applications. It also enables developers to create workflows and automate business processes by connecting data and functionality across different services. While the MICROSOFT Graph API is one useful tool for configuring the delivery of third-party services to the customer tenant 504, any other suitable tools or resources, e.g., programmatic interfaces native to any particular multi-tenant platform or the like, may also or instead be used.

In an electronic mail example, configuration of the customer tenant 504 may include configuring mail flow rules 514 for the customer tenant 504 to divert inbound and/or outbound electronic mail traffic through a mail security rules engine 516 or other similar security resource hosted on the threat management facility 503. The mail flow rules 514 may include any set of conditions and actions that may be applied to email messages as they flow through a mail system. The mail flow rules 514 may allow an administrator to control the behavior of messages based on various criteria, such as the sender, recipient, subject, message content, or other message attributes. Configuring the mail flow rules 514 through the digital identity 512 advantageously avoids a need to manage domain name records or external network traffic for the electronic mail server. All of the security-related mail traffic may be managed inside the customer tenant 504 in a manner that is fully transparent to senders and receivers of electronic mail, except in the event that the mail security rules engine 516 detects a security risk or the like and generates an electronic mail notification.

The customer tenant 504 may include one or more connectors 515, which may also be configured by the digital identity 512 and used to managed access to external resources as described herein. In general, the connectors 515 may include any components for facilitating communication between resources, services, and the like, or that control, or assist in the control of, communications among components. In the context of MICROSOFT OFFICE365 AND EXCHANGE ONLINE, the term "connector" may have a more specific meaning. For example, an EXCHANGE ONLINE connector may be any set of instructions that control the flow of email messages to and from an OFFICE365 customer. These may include inbound connectors that control the flow of messages that are sent to the customer, and outbound connectors that control the flow of messages sent from the customer. OFFICE365 also has connectors for developers to allow integration with third-party applications and services, which may be used, for example, to push or fetch data between OFFICE365 and external systems. As used herein, a connector may include any of the foregoing, or any other component to facilitated communications among programmatic resources in a cloud-based, distributed, and/or multi-tenant environment.

It will be appreciated that, while the data flows in FIG. 5 illustrate inbound and outbound mail being redirected directly from the customer tenant 504 to the threat management facility 503, electronic mail traffic may also or instead be diverted to the security tenant 510 co-located with the customer tenant 504 on the multi-tenant platform 502, and the security tenant 510 may for example (a) forward this electronic mail traffic to (and receive processed traffic from) the threat management facility 503, or (b) retrieve security rules from the mail security rules engine 516 of the threat management facility 503 for execution by the security tenant 510 on the multi-tenant platform 502. Any such configuration may be used provided there are suitable security safeguards on communication of the electronic mail traffic, and on access/control of customer data by the digital identity 512 for the security tenant 510.

Figure 6:
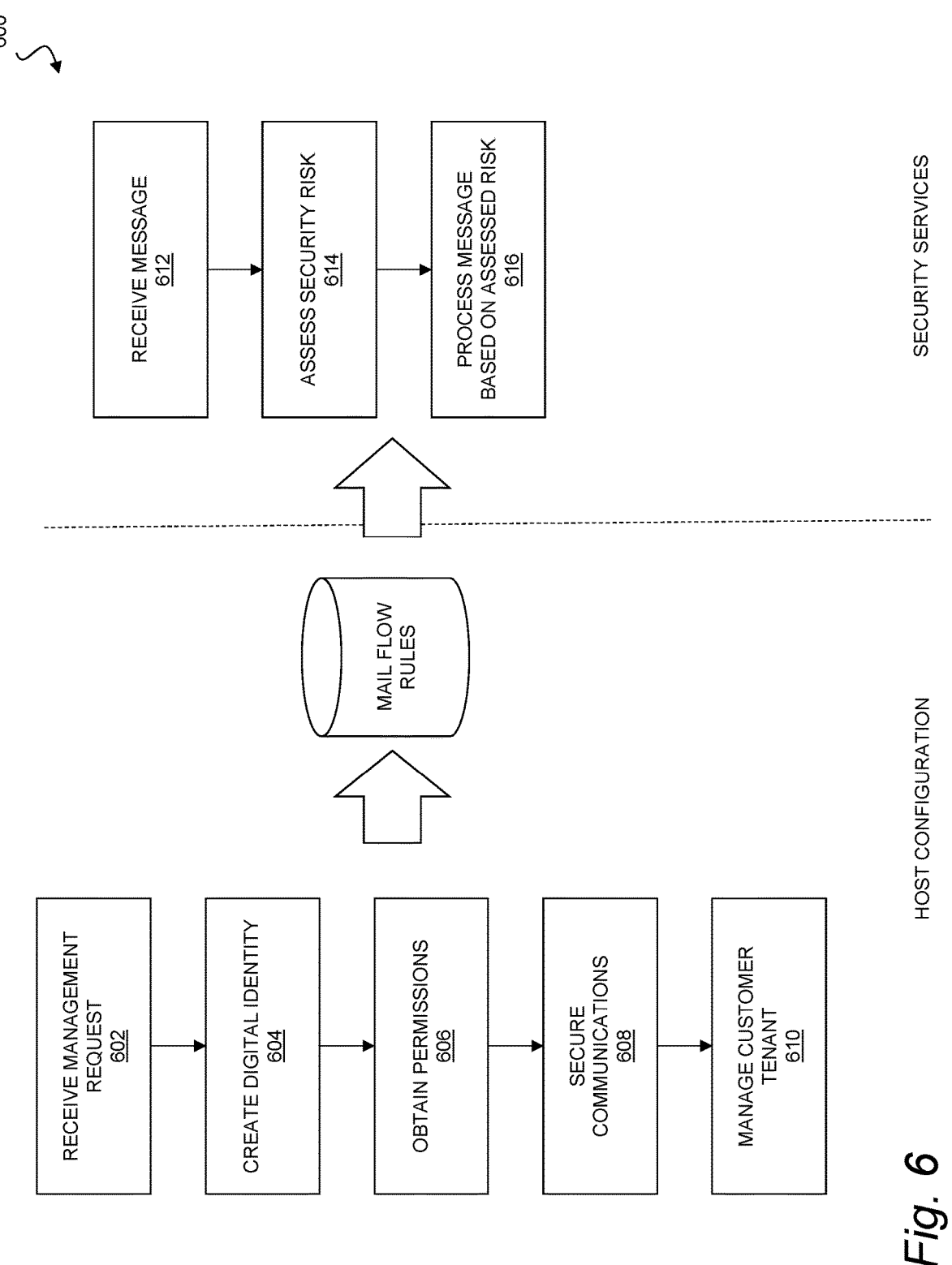
FIG. 6 shows a method for remotely managing a service tenant in a cloud computing platform.

FIG. 6 shows a method for remotely managing a service tenant in a cloud computing platform. In general, a cloud computing platform may host a multi-tenant environment. The multi-tenant environment may include a customer tenant, such as a cloud-based electronic mail tenant, and remote security services. The remote security services may configure the customer tenant to permit remote access to local resources used at the customer tenant to facilitate the remote security services. In this manner, the remote security services may be used with the resources hosted at the customer tenant without requiring changes to the tenant's network configuration.

As shown in step 602, the method 600 may include receiving a management request, such as a request from a user, at a console of a threat management facility, to securely manage electronic mail communications for an electronic mail tenant hosted at a first cloud computing platform. The electronic mail tenant may, for example, host an electronic mail service for an enterprise associated with the user, or any other service or combination of services that might usefully be hosted in a multi-tenant environment. The first cloud computing platform may, for example, include any of the multi-tenant platforms described herein. In one aspect, the threat management facility may be hosted at a second cloud computing platform independent from the first cloud computing platform hosting the electronic mail tenant. That is, the threat management facility may remotely provide security services for the electronic mail tenant, without maintaining direct access, as a user or other digital identity, to administrative functions of the electronic mail tenant.

In general, the recipient of the request may, e.g., invoke the use of a security tenant for the threat management facility that is hosted on the first cloud computing platform for the service tenant, and may initiate secure management of the electronic mail tenant (or other service tenant) from the security tenant by performing a number of steps orchestrated by the threat management facility and executed, at least in part, by the threat management facility hosted on the second cloud computing platform, such as the steps described below. In one aspect, the security tenant may instead be hosted on a third cloud computing platform independent from the first computing platform of the customer and the second computing platform of the threat management facility, but capable of obtaining suitable permissions from the electronic mail tenant (or other service tenant) and providing suitable security for the uses described herein.

As shown in step 604, the method 600 may include causing the electronic mail tenant to create a digital identity for use by the security tenant when accessing the electronic mail tenant for management purposes, as more generally described herein. More generally, this may include causing a service tenant to create a digital identity for use by a management tenant when accessing the service tenant. The digital identity may be stored in a secured database within the first cloud computing platform (e.g., at the electronic mail tenant and/or the customer tenant).

In one aspect, causing the creation of the digital identity may include verifying a domain used by the electronic mail tenant before creating the digital identity. This usefully prevents a security customer of the threat management facility from accidentally or maliciously reconfiguring mail services, e.g., to redirect electronic mail through another external resource. Domain verification may be performed, for example, as described in U.S. application Ser. No. 18/089,967 filed on Dec. 28, 2022, the entire contents of which are hereby incorporated by reference, or using any other suitable technique or combination of techniques. In one aspect, domain verification may include providing a unique text string to a (domain verification) requester and asking the requester to place the text string in a Domain Name Service record for the corresponding domain as proof of ownership or control of the corresponding domain by the requester.

As shown in step 606, the method 600 may include obtaining a set of permissions, such as permissions from an electronic mail tenant for a digital identity to modify mail flow rules used by the electronic mail tenant to process electronic mail traffic. This may, for example, include a set of permissions such as a permission for managing the electronic mail tenant, a permission for reading directory data at the electronic mail tenant, a permission for reading activity for the electronic mail tenant, a permission for signing into the electronic mail tenant, and a permission for reading domain information for the electronic mail tenant. In one aspect, the set of permissions may include a permission for read and write access to role-based access control settings for the electronic mail tenant. More generally, any permission or set of permissions useful for configuring the customer tenant may be requested. This may include presenting an explicit request for permissions to a user in a user interface of the threat management facility console, or in a separate session or window coupled to permissions management, access management, or identity management for the customer tenant, along with a request for suitable credentials or other security factors, as appropriate.

More generally, obtaining permissions may include obtaining any permission or combination of permissions suitable for a management tenant to manage a services tenant as contemplated herein.

As shown in step 608, the method 600 may include securing communications with a secret. For example, this may include securing communications between the electronic mail tenant and the security tenant with a secret stored by the security tenant and uniquely associated with the digital identity of the electronic mail tenant. In general, this secret may be created by or retrieved from a key management system securely accessed by the security tenant or the threat management facility. In some embodiments, the key management system may be hosted outside the first cloud computing platform. The secret may advantageously be associated strictly and uniquely with the digital identity and/or customer tenant in order to limit security exposure associated with external access to the customer tenant. This approach advantageously limits the scope of security exposure, more specifically by preventing an exposure of key material from compromising portions of the multi-tenant environment beyond the specific customer tenant and security tenant that share the exposed secret. In general, the secret may be used to create a digital certificate, a digitally signed certificate, or the like, which may be used in turn to authenticate to the customer tenant when requesting access and performing transactions. While stated explicitly here, it will be appreciated that securing communications may happen implicitly, e.g., when a key is created and bound to the digital identity for access to a customer tenant by a security tenant. For example, a cryptographic key associated with the digital identity may be used to create a digitally signed certificate that is used in turn by the security tenant to obtain an access token for programmatic access to the electronic mail tenant.

As shown in step 610, the method 600 may include managing a services tenant with the digital identity. For example, this may include causing the digital identity to manage a customer tenant such as an electronic mail tenant. In the electronic mail example, this may include causing the digital identity to modify the mail flow rules for the electronic mail tenant to redirect electronic mail traffic to a mail security service hosted on the security tenant. For example, the digital identity may modify the mail flow rules to redirect outbound electronic mail traffic from the electronic mail tenant to the mail security service for security analysis. This may also or instead include causing the digital identity to modify the mail flow rules to redirect inbound electronic mail traffic for the electronic mail tenant to the mail security service for security analysis. While modifying mail flow rules is one useful embodiment of the techniques described herein, managing the customer tenant with the digital identity may include modifying any set of rules or behaviors for the customer tenant. For example, the customer tenant may include a gateway service for authenticating users in an enterprise network, and the digital identity may modify one or more security policies for the gateway that include one or more rules for controlling, limiting, or authorizing network access by an endpoint and/or user of resources within an enterprise network managed by the gateway.

As shown in step 612, the method 600 may include receiving an inbound or outbound electronic mail that has been redirected from the electronic mail tenant according to the mail flow rules configured for the customer host. This may include receiving the electronic mail at any suitable remote mail security service, such as a mail security rules engine for a threat management facility. As a significant advantage, this permits the customer tenant to benefit from the security resources available to a threat management facility, such as any of the threat management facilities described herein, without the need to install and maintain security-related infrastructure on the customer tenant. As noted herein, while an electronic mail tenant is one useful embodiment of the techniques described herein, this may also or instead include any redirected or externally hosted service or the like that may be used to augment or manage operations of the customer tenant.

As shown in step 614, and continuing the example of an electronic mail tenant, the method 600 may include assessing a security risk of an inbound or outbound electronic mail message with a remote mail security service. This may include any scans, detections, machine learning or artificial intelligence assessments, or other threat detections, analysis or the like that might usefully be applied to electronic mail communications by a threat management facility. The threat management facility may include one or more threat detection tools for assessing the security risk. In some embodiments, assessing the security risk may include assigning a security risk level to the inbound or outbound electronic mail message. For example, assigning the security level may be a binary determination (risky/not risky). Alternatively, the message may be assigned a degree of riskiness.

As shown in step 616, the method may include processing the electronic mail message according to the assessed risk. For example, this may include in response to identifying an elevated security risk associated with an outbound electronic mail message, initiating a remedial action. This may include any suitable remedial action based on the nature of the detected risk. For example, if the possible risk is data leakage, the method may include quarantining a source of the outbound electronic mail, performing a virus scan or the like on the source of the outbound electronic mail, and/or searching for similar communications from other endpoints or the like for an enterprise associated with the customer tenant. Remedial actions may also or instead include replacing the electronic mail message with a substitute message describing the nature of the detection, or initiating a separate communication through any suitable medium to the account holder, an enterprise administrator, or any other suitable personnel. Processing the electronic mail may instead include, in response to determining that the outbound electronic mail message does not pose an elevated security risk, returning the outbound electronic mail message to the electronic mail tenant for outbound handling as a safe message. More generally, the message may be returned to the tenant and flagged in any suitable manner for forwarding to a destination address using the mail services of the electronic mail tenant.

In another aspect, processing the electronic mail message may include, in response to identifying an elevated security risk associated with the inbound electronic mail message, initiating a remedial action. In the case of an inbound electronic mail, different types of analysis and detection may be appropriate, such as scanning for phishing attacks, viruses, and so forth. Remedial actions may also or instead include replacing the electronic mail message with a substitute message describing the nature of the detection, or initiating a separate communication through any suitable medium to the account holder, an enterprise administrator, or any other suitable personnel. Remedial actions may also or instead include transmitting the electronic mail message to a sandbox environment where the message may be concurrently opened for remote preview from an endpoint and scanned for possible malware. Processing the electronic mail may instead include, in response to determining that the inbound electronic mail message does not pose an elevated security risk, returning the inbound electronic mail message to the electronic mail tenant for inbound handling as a safe message. In this case, the message may be flagged as safe and returned to the electronic mail tenant for further processing as a safe message, e.g., for delivery to an electronic mail box for a user hosted at the electronic mail tenant.

As noted above, while an electronic mail tenant may usefully be managed as described herein, the techniques described herein may also or instead be used in a variety of other contexts where a remote service is to be used with a cloud based or other remotely hosted service or the like. Thus, in one aspect, there is more generally described herein a method for remotely managing a customer tenant in a cloud computing platform, the method including: providing a management service executing on a management tenant in the cloud computing platform; receiving a request from a user, at a console of a management facility remote from the cloud computing platform, to manage the customer tenant; and in response to the request, initiating remote management of the service by, from the management tenant, performing the steps of: causing the customer tenant to create a digital identity for the management tenant to use one or more services of the customer tenant, securing a set of permissions from the customer tenant for the digital identity to modify operation of the customer tenant, configuring the digital identity to authenticated to the customer tenant based on a cryptographic key, the cryptographic key uniquely associated with the customer tenant and the digital identity, and causing the digital identity to modify operation of the customer tenant for remote use of the security service of the security tenant.

For example, in some embodiments, the customer tenant may include a login service configured to validate user credentials, and the digital identity may be configured to configure validation rules for validating user credentials. In some embodiments, the customer tenant may include a gateway service configured to manage authentication of users for access to a web application for an enterprise network, and the digital identity may be configured to configure authentication rules for authenticating users. The gateway service may be a zero trust network access (ZTNA) gateway providing secure connectivity for users in a ZTNA environment. In some embodiments, the customer tenant may include a database service configured to access a database, and the digital identity may be used to configure schema rules for organizing the database.

Other example embodiments of onboarding and configuration of mail flow rules for a remotely hosted electronic mail tenant are described by way of non-limiting example in Indian Patent App. No. 202311013127 filed on Feb. 27, 2023, the entire content of which is hereby incorporated by reference. It should be emphasized that these example embodiments are provided as examples only, and are not intended to limit the scope of this disclosure, or the following claims.

Figure 7:
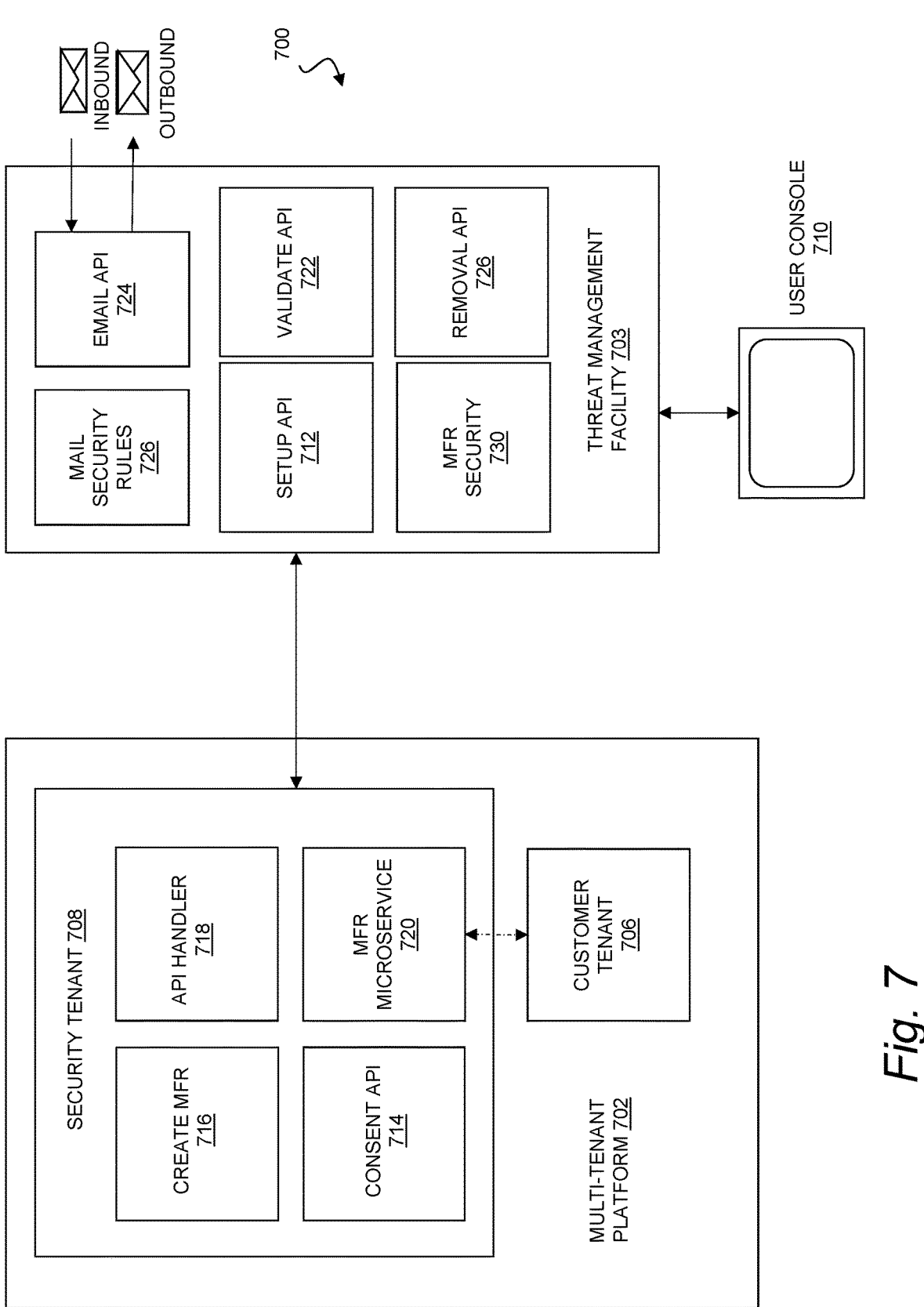
FIG. 7 shows an environment for remotely managing a service tenant in a cloud computing platform.

FIG. 7 shows an environment for remotely managing a service tenant in a cloud computing platform. The environment 700 may include a multi-tenant platform 702 hosted on the cloud computing platform (not shown, but including the multi-tenant platform 702). The environment 700 may also include a threat management facility 703, such as any of the threat management facilities described herein for managing security policies for an enterprise network or the like. The threat management facility 703 may include one or more tools for providing security securities for a customer tenant 706 or other service tenant as described herein, such as application programming interfaces (API), applications, services, microservices, and the like that support various configuration, monitoring, and related services and functions. The threat management facility 703 may be coupled in a communicating relationship with the multi-tenant platform 702.

The multi-tenant platform 702 and/or the threat management facility 703 may be deployed in one or more computing environments, e.g., to support data isolation among entities, compute resources, and so forth. For example, the multi-tenant platform 702 and/or the threat management facility 703 may include one or more virtual private clouds, containerized computing objects, microservices, data streams, and so forth. More generally, any suitable type of computing environment(s) may be used, including virtual private networks, virtual private servers, Kubernetes clusters, multi-tenant platforms, and the like.

The multi-tenant platform 702 may include a customer tenant 706 providing cloud-based services to a customer, along with a security tenant 708 configured to manage the customer tenant 706. The customer tenant 706 may be any tenant configured to provide customer services, such as any of the service tenants described herein. For example, the customer tenant 706 may be an electronic mail tenant providing electronic mail services (e.g., OFFICE365) within an enterprise network. The customer tenant 706 may operate on the same multi-tenant platform that hosts the security tenant 708. However, it is to be appreciated that the customer tenant 706 may alternatively be hosted on a tenant platform separate from the security tenant 708. In this case, the tenant platform for the security tenant 708 may advantageously be configured to support the remote use of a digital identity or the like on the customer tenant 706, in order to support, e.g., configuration of mail flow rules or the like to support external access for security and management of the customer tenant 706. The security tenant 708 may be any tenant configured to remotely manage the customer tenant 706. The security tenant 708 may include one or more tools for monitoring, configuring, or otherwise managing the customer tenant 706.

In general, a user or an administrator may initiate a request at a user console 710 to the threat management facility 703 for securely managing the customer tenant 706. The request may include requests to access resources and data at the customer tenant 706. A setup API 712 at the threat management facility 703 may be called to set up remote management of the customer tenant 706 in response to the request. The setup API 712 may request a set of permissions from the customer tenant 706 to create and manage applications in the customer tenant 706. The set of permissions may include one or more of managing a customer tenant, managing other applications created by a customer tenant, reading directory data at a customer tenant, reading activity for a customer tenant, signing into a customer tenant, reading domain information for a customer tenant, or otherwise requesting environment data, providing configuration information, and/or managing the creation and use of a tenant.

Where a security tenant 708 is not present on the multi-tenant platform 702 for use by the threat management facility 703, the setup API 712 may also or instead be used to create the security tenant 708 and configure the security tenant 708 with a digital identity for accessing the customer tenant 706 as further described herein. The customer tenant 706 may then grant the permissions to the security tenant 708 for one or more domains of multi-tenant platform 702 used by the customer tenant 706. In other cases, the security tenant 708 may have already been created and obtained permissions for the customer tenant 706 for the expected security management purposes. In this case, access to the setup API 712 may be skipped.

The security tenant 708 may also include a consent API 714 for managing requests to the customer tenant 706 (or a domain or platform hosting the customer tenant 706) for permissions needed to manage security, such as permissions to create and manage applications on the customer tenant 706, or consent to otherwise access data or modify the customer tenant 706 as needed. The consent API 714 may be called directly by the setup API 712 from the threat management facility 703, or by the security tenant 708 as needed to respond to requests from the setup API 712, or to respond to other requests from the threat management facility 703 as described herein. In some cases, e.g., where the security tenant 708 has already been created, and has already acquired needed permissions (e.g., for mail flow rule management or other services), the security tenant 708 may proceed to interact with the customer tenant 706 without additional requests for consent.

After obtaining any needed permissions, the security tenant 708 may interact with the customer tenant 706 to perform security tasks. In one aspect, a Mail Flow Rules ("MFR") creation tool 716 at the security tenant 708 may be used to create and manage mail flow rules at the customer tenant 706. The mail flow rules may, for example, control the behavior of electronic mail traffic at the customer tenant 706. In one aspect, mail flow rules are executed as an application within the customer tenant 706 that is created and/or configured by the security tenant 708 through the MFR creation tool 716. The mail flow rules may be stored in an MFR database hosted at any suitable location in the environment 700, e.g. on the threat management facility 703. The MFR creation tool 716 may set any permissions required for the mail flow rules to run, and may request consent or permissions using the consent API 714 as needed.

An API handler 718 at the security tenant 708 may perform other setup tasks. The setup actions may include any suitable setup action for remote management of the customer tenant 706. For example, the API handler 718 may validate an email domain of the customer tenant 706 to ensure that the customer tenant 706 is authorized to use the email domain. To this end, each email domain of the customer tenant 706 may have a property field (e.g., isVerified) denoting a verification status of the email domain, which may be checked and/or updated with the API handler 718 as needed. If the property field indicates that the domain is verified (e.g., true), the API handler 718 may perform further setup actions. Otherwise, the API handler 718 may initiate a cleanup process in the customer tenant 706, e.g., to terminate mail flow handling, revise domain information, or otherwise respond to the inability to verify a requested domain.

The setup actions by the API handler 718 may also or instead include creating a key or other secret for securing communications between the security tenant 708 and the customer tenant 706. This secret may be created by or retrieved from a key management system (e.g., AWS Key Management Service) securely accessed by the security tenant 708 or the threat management facility 703. In some embodiments, the key management system may be hosted outside the environment 700, e.g., by a trusted third party, identity management platform, or the like. The secret may advantageously be associated strictly and uniquely with the customer tenant 706 in order to limit security exposure associated with the access privileges accompanying the secret. The setup actions may include creating a digital certificate with the secret, e.g., by cryptographically signing the certificate using the secret or a cryptographic key associated with the secret. The digital certificate may be used to authenticate the security tenant 708 to the customer tenant 706. In some embodiments, the digital certificate may have a valid time, e.g., to ensure that the certificate expires after some predetermined interval. In some embodiments, the valid time may be at least 10 years, however shorter intervals may be used, e.g., to increase security and/or to require periodic recredentialing of users of security services. The setup actions may include securely storing the certificate at a database hosted by a cloud storage service associated with the threat management facility 703, the multi-tenant platform 702, or some other cloud computing platform or other data storage resource. For example, the certificate may be stored in a database hosted by Amazon S3, Google Cloud Storage, or AZURE Blob Storage. In some embodiments, the database may be hosted within the security tenant 708.

In another aspect, the setup actions may include generating appropriate telemetry data, such as application ID's, domain names, consent statuses (e.g., granted/rejected), connect times, certificate checksums, and the like. The telemetry data may be stored and sent to the user or administrator upon request. The setup actions may also or instead include generating a message queue for creating the mail flow rules and connectors. The message queue may be hosted in whole or in part at the security tenant 708 or other location(s), and may be generated with a message queuing service, such as SQS, RabbitMQ, Apache Kafka, MICROSOFT AZURE Service Bus, IBM MQ, and the like.

A Mail Flow Rules ("MFR") microservice 720 at the security tenant 708 may handle communications with the customer tenant 706, e.g., to setup MFR handling on the customer tenant 706, monitor MFR activity, and so forth. The MFR microservice 720 may process messages through the message queue, such as a create rule message, an update rule message, and a remove rule message. The MFR microservice 720 may be configured to run configuration scripts (e.g., POWERSHELL® scripts) to process messages. The MFR microservice 720 may also or instead generate telemetry data to track changes to the mail flow rules, such as customer tenant ID's, application ID's, domain names, operation types (e.g., create, update, remove), operation statuses, and the like. The telemetry data may be stored and logged for use by the user or administrator, either at the security tenant 708, at the threat management facility 703, or some combination of these.

Returning to the threat management facility 703, a validate API 722 may be used to validate mail flow rules, e.g., in response to a user request submitted through the user console 710, or based on a modification of the mail flow rules, e.g., as detected by the security tenant 708. In general, the mail-flow rules may be validated empirically by transmitting one or more test email messages to the customer tenant 706 and monitoring the results for correct mail flow behavior, or using other analytical techniques such as by retrieving and analyzing corresponding mail flow configuration information from the customer tenant 706. A validation status may then be returned and used as necessary or helpful for additional configuration. In one aspect, mail flow rule validation may be performed with the validate API 722 automatically in response to any changes to mail flow rules, and before processing mail flow according to the changed mail flow rules.

An email API 724 at the threat management facility 703 may accept inbound and/or outbound email messages from the customer tenant 706 and deliver the email messages back to the customer tenant 706. The email API 724 may accept the email messages by storing received email messages in an email message queue. The email API 724 may be configured with one or more load balancers so that an instance of the API executing on the threat management facility 703 will only accept email messages only from specified customer tenants, services, and/or domains. To deliver an email message to the customer tenant 706, the email API 724 may read the email message from the email message queue and, after analysis according to security rules provided by the mail security rules engine 726 stored for the customer tenant 706 at the threat management facility 703, return the email message to the mail flow at the customer tenant 706 for delivery as appropriate. The email API 724 may send received email messages to the mail security rules engine 726 or any similar security resources described herein, where the email messages may be processed according to any suitable electronic mail security rules for the customer tenant 706. The email API 724 may also or instead receive processed messages from the mail security rules engine 726 for return to the customer tenant 706 if/as appropriate.

A removal API 728 at the threat management facility 703 may be used to remove (or otherwise reconfigure) mail flow rules upon request from the user console 710, or in response to a determination by the validation API 722 or other resource that a particular mail flow rule or group of mail flow rules (e.g., a group associated with an MFR update) is invalid, insecure, unauthorized, or otherwise inappropriate for use on the customer tenant 706. The removal API 728 may generate a remove rule message (e.g., an SQS message) to the security tenant 708 to remove a mail flow rule stored on the customer tenant 706 for directing mail flows. For example, using the removal API 728, a mail flow rule may be removed, and a removal status of the mail flow rule may be updated in the MFR database.

In the context of mail flow rules, a subscription may be created for related event logs or activities using event rules or the like, such that information related to mail flow rules is communicated to the threat management facility 703 where it can be reviewed, analyzed, and the like. For example, an event rule may be configured to generate an event at a set interval (e.g., every hour). The particular event rule may be an Amazon CloudWatch event rule, which monitors AWS resources and applications that run on the customer tenant 706 and generates a Simple Queue Service (SQS) message to communicate the results. When the event is generated, domains that are connected through mail flow rules from a database program (e.g., MongoDB) may be fetched, and an SQS message related to tamper detection lookup or the like may be generated for each database. These messages may be provided to the security tenant 708 for use in determining whether changes have been made to mail flow rules. The security tenant 708 may include logic for determining, e.g., based on the information in the SQS message, whether tampering with the customer tenant 706 has occurred, for example, due to modifications to any of the mail flow rules stored on the customer tenant 706.

The security tenant 7068 may apply any logic, rules, lookups, or the like to evaluate whether an application associated with a customer domain has subscription access to audit logs on OFFICE365. In an example, the security tenant 708 may be such an application associated with the domain for accessing the audit logs. If additional authentication is required to access the audit logs for applications on the customer tenant 706, an access token may be obtained for the application, e.g., using the consent API 714. Access to audit logs may last for a predetermined length of time, for example, one hour. The audit logs may also or instead be filtered such that events that are not of interest are not provided. For example, the audit logs may be filtered to provide information related to modifications to mail flow rules.

In one aspect, the threat management facility 703 may be configured to receive information about changes to mail flow rules, and to evaluate whether the rules have been tampered with, e.g., maliciously or accidentally, in a manner that compromises security of the customer tenant 706. For example, information obtained through API calls to the security agent 708, and or received through subscriptions to audit logs, may serve as an initial set of information for identifying whether a mail flow rule has been tampered with. Following receipt of this initial information, additional information may be obtained using other techniques. For example, a connection may be established with the application running on the customer tenant 706 (e.g., Exchange Online) via POWERSHELL to execute commands to retrieve additional information related to mail flow rule modifications, and/or modifications to connectors (such as any of the connectors described herein) that couple the customer tenant 706 mail flows to the threat management facility 703. Any confirmed tamper events may be assigned a severity in the form of a classification, measure, score, or the like that indicates the degree of risk associated with the tampered mail flow rule(s) and/or connector rule(s). Information related to the tamper events and associated severity measures may be processed and stored, and a SQS message including any of this information may be generated and provided to the threat management facility 703 for risk assessment, remediation, and the like.

A mail flow rule security engine 730 may be provided on the threat management facility 703 or other suitable location for monitoring and analyzing changes to mail flow rules, and evaluating riskiness associated with modifications to the mail flow rules. The MFR security engine 730 may, for example, receive an SQS message from the security tenant 708 (or the customer tenant 706, where the customer tenant 706 can log data directly to the threat management facility 703) with information related to MFR modifications implemented on the customer tenant 706. As an initial measure, the threat management facility 703 may respond to a mail flow rule change by updating the statuses of the various related domains to reflect that a potential security issue exists. The updated status may be presented to an administrator or automated response system as an indication to view additional details related to the information that caused such a domain status update. For example, the threat management facility 703 may generate a notification, such as an electronic message, and send the notification to one or more account administrators, along with additional supporting information concerning, e.g., potential tampering events and corresponding risk severity. Further, an SQS message may be generated for presentation on a central dashboard or other security user interface.

Once a mail flow rule is identified as being tampered, there are a variety of actions that may be automatically and/or manually performed in response (in addition to an administrative notification, as noted above). Actions that may be triggered via an alert notification include acknowledging the alert (e.g., clicking a user interface element to acknowledge receipt of the notification, and or to confirm a decision to take no action), running a test of the mail flow rule for malicious exposure or activity, automatically remediating the identified tamper event, e.g., by removing the mail flow rule update(s), and the like. Running a quick test allows the administrator to remediate the customer tenant 706, such as by identifying one or more of the mail flow rules that can be manually adjusted, repaired, or removed, or by permitting an administrator to attempt a manual fix and testing the results. Thus, for example, following a manual fix, the administrator may run a quick test to confirm that the fix remediated the mail flow rule modification. In one aspect, a quick test may include sending an electronic message and verifying that the email was routed through the threat management facility 703 for security analysis as intended, e.g., as described herein. If the quick test confirms that the electronic message was properly routed through the threat management facility 703, then the corresponding mail domain may be enabled to resume its non-alert (e.g., connected) status.

An auto correct feature may also or instead be included that allows the administrator to have the tamper events corrected automatically. Automatic correction may include reverting a modified mail flow rule to a previous version, disabling a mail flow rule associated with a modification, and/or deleting a modification. Automatic correction may further include attempting to correct a mail flow rule modification, performing a validation of the attempted correction, and based on a result of the validation, signaling to an administrator and/or the customer tenant 706 that the corresponding domain may be enabled to resume its non-alert status.

In addition to these and other options for taking action to fix the modified (e.g., tampered-with) mail flow rule, administrators may view additional information related to the mail flow rule. Such information may be used to manually fix the modification such that proper security may be established or reestablished. For example, for each connected domain for which tampering is detected, a connection status may be displayed with additional details or a link to view additional details. Each mail flow rule and/or connector associated with tampering may also be displayed along with details related to an actual or suspected tampering. Such information may be accessible by an administrator, e.g., via the user console 710 of the threat management facility 703.

Figure 8:
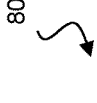
FIG. 8 shows a method for detecting tampering with hosted services.
Figure 8:
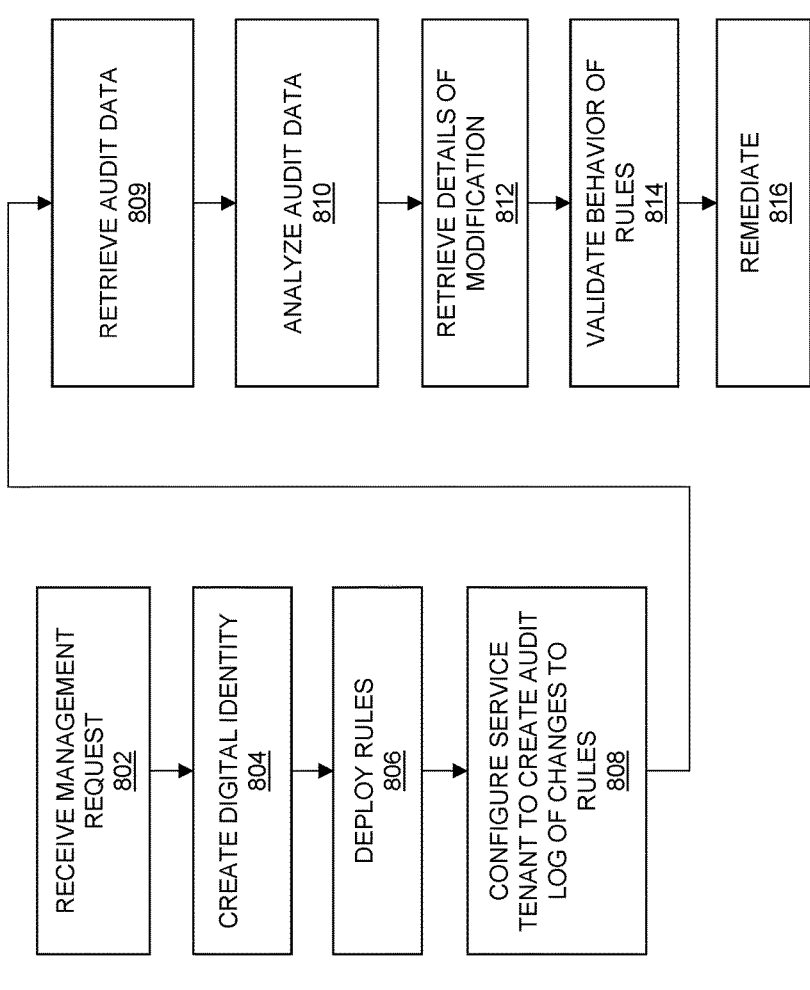

FIG. 8 shows a method for detecting tampering with hosted services.

As shown in step 802, the method 800 may include receiving a request from a user. The request may be received, for example, through a console of a threat management facility, and may include a request to securely manage electronic mail communications for an electronic mail tenant hosted at a first cloud computing platform. The electronic mail tenant may include any of the electronic mail tenants described herein, and may host an electronic mail service for an enterprise associated with the user. More generally, while an electronic mail tenant is described, the method 800 may be used with any service tenant, customer tenant, or the like that might usefully have security services or other services provided by an external resource. The first cloud computing platform may, for example, include any of the multi-tenant platforms described herein. In one aspect, the threat management facility may be hosted at a second cloud computing platform independent from the first cloud computing platform that hosts the electronic mail tenant. In this configuration, the threat management facility may provide remote security services indirectly, e.g., through a digital identity created for another (security) tenant on the multi-tenant platform. While this can provide separation between the security services of the threat management facility and the customer services provided by the multi-tenant platform, it may also create security challenges, e.g., by preventing direct monitoring of security-related events on the multi-tenant platform. To address this challenge, a technique is described herein for externally monitoring for associated tampering or other malicious activity on the service tenant.

In response to the request, the method 800 may include initiating secure management of the electronic mail tenant from a security tenant hosted at the first cloud computing platform by performing a number of steps orchestrated by the threat management facility and executed at least in part by the threat management facility hosted on the cloud computing platform in cooperation with a security tenant on the multi-tenant platform that hosts the managed, electronic mail tenant. This may include a variety of additional steps. For example, initiating secure management may include verifying a domain used by the electronic mail tenant before creating the digital identity. This usefully prevents a security customer of the threat management facility from accidentally or maliciously reconfiguring mail services, e.g., to redirect electronic mail through another external resource. Domain verification may be performed, e.g., as described herein, for example by providing a unique text string to the requester and asking the requester to place the text string in a Domain Name Service record for the corresponding domain, where access can be verified by the presence of the text string in the Domain Name Service record.

As shown in step 804, the method 800 may include causing the electronic mail tenant to create a digital identity for use by the security tenant when accessing the electronic mail tenant for management purposes, as more generally described herein. More generally, this may include causing a service tenant for a customer to create a digital identity for use by a management tenant, such as a security tenant, that is, in turn, managed by an external threat management facility. The method 800 may also or instead include performing one or more actions for obtaining permissions for a digital identity and securing communications with the digital identity, such as any of those described herein. In general, the digital identity may be used to manage a customer tenant. In an electronic mail example, this may include causing the digital identity to create connectors to a mail security rules engine hosted on a threat management facility, and modifying the mail flow rules for the electronic mail tenant to redirect electronic mail traffic to the mail security rules engine. For example, the digital identity may modify the mail flow rules to redirect outbound electronic mail traffic from the electronic mail tenant to the mail security rules engine for security analysis. This may also or instead include causing the digital identity to modify the mail flow rules to redirect inbound electronic mail traffic for the electronic mail tenant to the mail security rules engine for security analysis.

As shown in step 806, the method 800 may include deploying one or more rules to the service tenant, or configuring or modifying existing rules. The rules may include any connection rules, which in this context, includes mail flow rules or other rules applied by a service tenant to facilitate the use of external services for the service tenant. This may, for example, include mail handling rules, connection interface rules, traffic rules, formatting rules, protocols, and so forth that support interactions with external resources. It will be understood that these connection rules, which are intended to support interaction with external services, are to be distinguished from the security rules described above, which are applied by an electronic mail security rules engine or the like to detect potentially malicious activity. For example, the connector rules may include mail flow rules or transport rules used in MICROSOFT Exchange Server and OFFICE365 environments to look for specific conditions in messages passing through the mail flow pipeline and take action on these conditions to process communications.

In a security context, these connector rules allow administrators to implement specific policies or security measures for an organization's emails. Each mail flow rule is generally made up of conditions (which represent the specific elements, features, or the like that determine the applicability of a rule), actions (what to do with messages that match those conditions), and exceptions (optionally specifying when not to apply a rule to a message matching the conditions). Mail flow rules may be used for a variety of purposes, including but not limited to applying message encryption, setting up message classifications, blocking messages with attachments that have specific file types, forwarding messages to specific individuals or teams for review, adding disclaimers to email messages, and so forth. In one specific embodiment, mail flow rules may be used as described herein to divert inbound and/or outbound messages to an external resource for security evaluation.

In the context of a MICROSOFT Exchange Server or the like, where mail flow rules might usefully be managed using the techniques described herein, a connector is a configured link between two servers that enables mail to flow between them. This may, for example, include a send connector that controls the flow of outbound messages to the receiving server, or a receive connector that represents a logical gateway through which inbound messages are received. These connectors help to define the path for inbound and outbound emails, and may be used as described herein to manage mail flow in a manner that facilitates external management of security for electronic mail communications. For MICROSOFT 365 or OFFICE365, there are also connectors which may be set up to control mail flow between the cloud and on-premises environments, which may also or instead be used to manage mail flow as contemplated herein. In general, connectors may be customized based on an organization's needs, e.g., by defining specific IP addresses to accept email from or send email to, by configuring the security mechanisms for a connection, and so forth.

As shown in step 808, the method 800 may include configuring the service tenant, e.g., an electronic mail tenant, to create an audit log of changes to the rules that control the service, e.g., by activating an audit function, logging service, or the like to log audit data. This may include configuring the service tenant with the digital identity created for the security tenant. Configuring the service tenant may also or instead include checking whether an application associated with a particular domain has a subscription to access audit logs in OFFICE365. An access token may be obtained for the security tenant as described herein, e.g., in order to gain access to logging functions and data on the service tenant, and to obtain information related to changes to mail flow rules. Access to audit logs may be obtained through a logging service on the service tenant and accessible by the digital identity of the security tenant.

As shown in step 809, the method 800 may include retrieving audit data, e.g., by requesting a retrieval of the audit data from the audit log for the service tenant. In general, this data may be used to identify changes in the connector rules so that they can be evaluated for potential tampering or malicious activity. The request for audit data may be initiated, e.g., by the digital identity for the security tenant, and may include retrieving the audit data to the security tenant for analysis, or forwarding the audit data to a threat management facility for analysis. The latter approach advantageously permits analysis using any native tools of the threat management facility, and is not limited to resources, API's and the like provided by the multi-tenant platform. In general, where the service tenant does not proactively push notifications about individual rules or connector modifications, this data may be requested using any suitable permissions and interface. While the corresponding data may be available in the audit log, for example, the service tenant may not provide a mechanism for proactively reporting changes of this nature. Thus, the audit log may be periodically polled on a recurring basis in an effort to timely retrieve changes to mail flow rules, connectors, and any other components of the service tenant that might be useful for providing security services. In one aspect, the retrieval may be requested on a predetermined schedule by the security service, e.g., hourly, daily, or at some other regular or varying interval. In another aspect, retrieval may be requested in response to other events, such as a software update, malware detection, or any other event or combination of events. In another aspect, audit data may be retrieved in response to a detected change in behavior by the service tenant, or based on a pushed alert about other modifications to the service tenant, such as to a modification to one or more of the rules.

In one aspect, retrieving audit data may include subscribing to audit events of interest for the service tenant (e.g., transport rules and connectors), and then analyzing these for suspicious activity. This advantageously controls the amount of data requested from a logging service of the service tenant, while still permitting periodic review for potentially suspicious activity on any desired schedule. The retrieved details may include some or all of the information included in the audit log. The details may for example be those provided by API calls to a resource storing the audit log or those provided through a connection to Exchange Online through POWERSHELL, as described above.

As shown in step 810, the method 800 may include analyzing the audit data. In general, this may include reviewing transport rules, connector changes, rule changes, and the like for possibly suspicious activity, e.g., activity that might affect the flow of mail, or the precedence of connection rules in a mail tenant configuration. This may include activity intended to maliciously redirect mail traffic, e.g., to avoid security screening or insert an intermediary for malicious monitoring or intervention. This may also or instead include innocent, but harmful, user changes to connector rules that interfere with the use of external security services as describe herein. For example, a new connector rule may be created by a customer for reasons unrelated to the security service. If this rule might bypass security redirection as described herein, or otherwise interferes with secure processing of electronic mail, then the modification should be identified, and possibly analyzed for security impact.

As shown in step 812, the method 800 may include retrieving details associated with a result of analyzing the audit data, e.g., from the service tenant or other sources. That is, if potentially suspicious or compromising activity is identified in a modification to the connector rules, additional details on the modification may be requested from the service tenant in order to analyze, for example, the state of mail flow rules or the like after the modification. Additional information related to changes to mail flow rules may be obtained using one or more API calls, POWERSHELL commands, or the like. Depending on the logging and reporting capabilities of the service tenant, this may also or instead include a retrieval of all mail flow rules and connector configurations for the service tenant, e.g., so that the complete mail flow posture can be analyzed, tested, or otherwise investigated for potential security issues.

As shown in step 814, the method 800 may include performing a validation of the behavior of one or more rules with the modification. Behavior validation may optionally be performed after additional details are obtained as described above, including, if necessary, a complete retrieval of mail flow rules and connector configurations for the service tenant for analysis. Behavior validation may include, e.g., analyzing or testing to evaluate the performance of desired security services. For example, this may include verifying that connection rules for electronic mail security on the service tenant have the highest priority (or an appropriately high priority to prevent malicious intervention), that the connection rules remain enabled, that the connection rules are functioning as expected, that the connection rules have not been modified or tampered with in a manner that prevents valid redirection of electronic messages as described herein for security purposes, and so forth. Performing the validation may include analyzing a behavior of the modified mail flow rules when executing in a context of all mail flow rules for the tenant. Performing the validation may also include analyzing a type and source of the modification. For example, a change in the destination of a mail flow by a non-administrative user may be more suspicious, while an increase in priority of a connector rule by an administrator accompanying a security update for the service tenant may be less suspicious.

As shown in step 816, the method 800 may include remediating the service tenant to restore valid execution of the one or more connector rules to support external services, e.g., by the threat management facility. Changes to connector rules that pose a security threat, or otherwise compromise the service tenant, may be remediated. Remediating mail flow rules may include notifying an administrator and providing the administrator with information related to the affected mail flow rules. Remediation may also or instead include providing an administrator with an option to manually remediate mail flow rules, or providing an option to have the system automatically remediate (or attempt to remediate) mail flow rules, as described above. The priority for remediating rules that have been tampered with may be based at least in part on severity measures associated with the risk posed by the changes to the respective rules.

In one aspect, remediation may include providing an alert to a user, such as a pop-up alert or electronic message to an administrator concerning a change that interferes with security-based mail flow rules. The remediation may also or instead include disconnecting the customer's mail tenant until a detected issue has been addressed. In another aspect, remediation may include performing a quick test on transport rules, connectors, and other resources configured by connector rules. This permits verification after a customer has, e.g., attempted to manually fixed a connector rule. For example, after making desired changes/repairs, the customer may explicitly request a quick test that sends a notification email and verifies whether the same email is correctly reaching the desired security resource (e.g., the security tenant, or the threat management facility). If the same email reaches the desired destination through the current mail flow rules, the domain status may be restored to a connected status. In another aspect, remediation may include automated correction of tampered rules, or reversal or roll-back of modifications to a previous, known, secure configuration.

More generally, remediation may include any action or combination of actions suitable for addressing tampering with mail flow rules on an electronic mail tenant, or more generally with changes to connector rules on a service tenant, or otherwise addressing a detected reconfiguration of connector rules for a tenant that may increase security risks for the customer or individual users. While the description of the method 800 herein emphasizes whether connector rule changes will negatively impact the provisioning of external, third party security services or the like, it will be appreciated that the ability to track changes to connector rules on a service tenant may more generally be used to detect changes that indicate malicious activity independent of third-party provisioning. For example, where a malicious actor obtains a malicious digital identity (or access to a non-malicious digital identity) and uses that digital identity to modify connector rules, e.g. to connect a malicious resource to the service tenant, this change to connector rules may usefully be detected and mitigated using the techniques described herein, even where the change does not impact security services or the like provided by a non-malicious resource.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A method for securely processing electronic mail comprising:

receiving a request from a user, at a console of a threat management facility remote from a first cloud computing platform comprising a multi-tenant environment, to securely manage electronic mail communications for an electronic mail tenant hosted on the first cloud computing platform, wherein the electronic mail tenant hosts an electronic mail service for an enterprise associated with the user; and in response to the request, initiating, with the threat management facility, secure management of the electronic mail tenant by a security tenant hosted at the first cloud computing platform by causing the security tenant to perform the steps of:

causing the electronic mail tenant to create a digital identity associated with the user, the digital identity used by the security tenant to access one or more services of the electronic mail tenant, obtaining a set of permissions from the electronic mail tenant for the digital identity to modify mail flow rules used by the electronic mail tenant to process electronic mail traffic, securing communications between the electronic mail tenant and the security tenant with a key stored by the security tenant and uniquely associated with the enterprise and the digital identity, wherein:

the security tenant supports access by the threat management facility to the one or more services of the electronic mail tenant, and the key is retrieved from a key management system securely accessed by the security tenant or the threat management facility, causing the security tenant to request access to the electronic mail tenant using the digital identity, the request including an access token obtained by the security tenant with a certificate digitally signed with the key, wherein the key is stored by the security tenant for use in authentication to the electronic mail tenant, and causing the security tenant, through the digital identity, to modify the mail flow rules for the electronic mail tenant to redirect the electronic mail traffic from the electronic mail tenant to a mail security service hosted on the threat management facility.

2. The method of claim 1, wherein the digital identity modifies the mail flow rules to redirect outbound electronic mail traffic from the electronic mail tenant to a remote mail security service for security analysis.

3. The method of claim 2, further comprising assessing a security risk of an outbound electronic mail message with the remote mail security service.

4. The method of claim 3, further comprising, in response to identifying an elevated security risk associated with the outbound electronic mail message, initiating a remedial action.

5. The method of claim 3, further comprising, in response to determining that the outbound electronic mail message does not pose an elevated security risk, returning the outbound electronic mail message to the electronic mail tenant for outbound handling as a safe message.

6. The method of claim 1, wherein the digital identity modifies the mail flow rules to redirect inbound electronic mail traffic for the electronic mail tenant to a remote mail security service.

7. The method of claim 6, further comprising assessing a security risk of an inbound electronic mail message with the remote mail security service.

8. The method of claim 7, further comprising, in response to identifying an elevated security risk associated with the inbound electronic mail message, initiating a remedial action.

9. The method of claim 7, further comprising, in response to determining that the inbound electronic mail message does not pose an elevated security risk, returning the inbound electronic mail message to the electronic mail tenant for inbound handling as a safe message.

10. The method of claim 1, wherein the access token enables programmatic access by the security tenant to the electronic mail tenant.

11. The method of claim 1, wherein the security tenant is a second electronic mail tenant hosted on the first cloud computing platform.

12. The method of claim 1, wherein the threat management facility is hosted on a second cloud computing platform remote from the first cloud computing platform.

13. The method of claim 1, wherein the set of permissions includes a permission for at least one of managing the electronic mail tenant, reading directory data at the electronic mail tenant, reading activity for the electronic mail tenant, signing into the electronic mail tenant, and reading domain information for the electronic mail tenant.

14. The method of claim 1, wherein causing the security tenant to obtain the set of permissions includes obtaining a permission for read and write access to role-based access control settings for the electronic mail tenant.

15. The method of claim 1, further comprising verifying a domain used by the electronic mail tenant before creating the digital identity.

16. A method for remotely managing security from a cloud computing platform, the method comprising:

creating a management service to securely manage operations of a service tenant hosted in a multi-tenant environment, the management service executing on a management tenant in the cloud computing platform;

receiving a request from an enterprise user, at a console of a management facility remote from the cloud computing platform, to manage the service tenant; and in response to the request, initiating remote management of the service tenant by, from the management tenant, performing the steps of:

causing the service tenant to create a digital identity associated with the enterprise user for the management tenant to access one or more services of the service tenant, securing, for the digital identity, a set of permissions from the service tenant for the digital identity to modify processing operations of the service tenant, configuring secure communications between the service tenant and the management tenant based on a cryptographic key stored by the management tenant, wherein:

the cryptographic key is uniquely associated with the enterprise user of the service tenant and the digital identity, the service tenant hosts the one or more services for the enterprise user and the management tenant, the management tenant supports access by the enterprise user through the management facility to the one or more services, and the cryptographic key is retrieved from a key management system securely accessed by the management tenant or the management facility, causing the management tenant to request access to the digital identity of the service tenant, the request using the cryptographic key for authentication by the service tenant, and causing the management tenant, through the digital identity, to modify the processing operations of the service tenant according to rules managed by the management facility for remote use of a security service for the service tenant.

17. A system comprising:

a first cloud computing platform comprising a first one or more processors configured by computer executable code to host a service tenant and a management tenant, wherein the service tenant is hosted in a multi-tenant environment; and a threat management facility remote from the first cloud computing platform and comprising a second one or more processors configured by computer executable code to provide security services for the service tenant, wherein the management tenant is configured to, in response to a request from an enterprise user at a console of the threat management facility to initiate remote management of the service tenant, perform the steps of:

causing the service tenant to create a digital identity associated with the enterprise user for the management tenant to access one or more services of the service tenant, securing, for the digital identity, a set of permissions from the service tenant for the digital identity to modify processing operations of the service tenant, configuring secure communications between the service tenant and the management tenant based on a cryptographic key stored by the management tenant, wherein:

the cryptographic key is uniquely associated with the enterprise user and the digital identity, the service tenant hosts the one or more services for the enterprise user and the management tenant, the management tenant supports access by the enterprise user through the threat management facility to the one or more services, and the cryptographic key is retrieved from a key management system securely accessed by the management tenant or the threat management facility, causing the management tenant to request access to the digital identity of the service tenant, the request using the cryptographic key for authentication by the service tenant, and causing the management tenant, through the digital identity, to modify the processing operations of the service tenant according to rules managed by the threat management facility for remote use of a security service for the service tenant.

18. The system of claim 17, wherein the service tenant is a first electronic mail tenant hosted on the first cloud computing platform, and the management tenant is a second electronic mail tenant hosted on the first cloud computing platform.

19. The system of claim 17, wherein the threat management facility is hosted on a second cloud computing platform remote from the first cloud computing platform.

20. The system of claim 17, wherein securing the set of permissions includes securing a permission for read and write access to role-based access control settings for the service tenant.

\* \* \* \* \*